(12) United States Patent
Gingras et al.

(10) Patent No.: US 10,507,600 B2
(45) Date of Patent: Dec. 17, 2019

(54) MODULAR TOOLING FOR MANUFACTURING MULTI-CAVITY COMPOSITE STRUCTURES

(71) Applicants: Bell Helicopter Textron Inc., Fort Worth, TX (US); National Research Council of Canada, Ottawa (CA)

(72) Inventors: Richard Gingras, Montreal (CA); Steven Roy, Montreal (CA); Marc-André Octeau, Laval (CA); Pascal Forget, Saint-Jérôme (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 187 days.

(21) Appl. No.: 15/264,118

(22) Filed: Sep. 13, 2016

(65) Prior Publication Data

US 2017/0072597 A1     Mar. 16, 2017

Related U.S. Application Data

(60) Provisional application No. 62/218,292, filed on Sep. 14, 2015.

(51) Int. Cl.
*B29C 33/30* (2006.01)
*B29C 70/34* (2006.01)
(Continued)

(52) U.S. Cl.
CPC .......... *B29C 33/301* (2013.01); *B29C 70/342* (2013.01); *B29K 2105/0872* (2013.01); *B29L 2031/082* (2013.01)

(58) Field of Classification Search
CPC ................ B29C 33/301; B29C 70/342; B29K 2105/0872; B29L 2031/082
See application file for complete search history.

(56) References Cited

U.S. PATENT DOCUMENTS 6,059,199 A    5/2000   Eriksson et al.
6,135,752 A   10/2000   Enomoto et al.
(Continued)

FOREIGN PATENT DOCUMENTS

CA     2210606 A1    4/1998
CA     2254206 A1    8/1999
(Continued)

OTHER PUBLICATIONS

Notice of Allowance in related Canadian Patent Application No. 2,942,019, dated Dec. 1, 2017, 1 page.

*Primary Examiner* — Vishal I Patel
(74) *Attorney, Agent, or Firm* — Lightfoot & Alford PLLC (57) ABSTRACT

A method of manufacturing a monolithic component having internal wall(s), including separately placing uncured composite material on a mold parts, placing the mold parts on a support plate with a portion of the uncured composite material extending between and in contact with the adjacent mold parts, interconnecting the adjacent mold parts through a connection allowing limited relative movement on the support plate along a direction corresponding to a thickness of the uncured composite material therebetween, biasing the adjacent mold part toward each other along the limited relative movement to provide a compressive force on the uncured composite material extending therebetween, and curing the composite material to obtain the monolithic component with each internal wall being formed between adjacent mold parts. The bias causes the adjacent mold parts to move toward each other as the thickness of uncured material extending therebetween reduces during curing. A tool assembly is also discussed.

14 Claims, 5 Drawing Sheets

(51) Int. Cl.
*B29K 105/08* (2006.01)
*B29L 31/08* (2006.01)

(56) References Cited

U.S. PATENT DOCUMENTS

| | | |
|---|---|---|
| 6,146,578 A | 11/2000 | Van Ert et al. |
| 6,206,681 B1 | 3/2001 | Kawase et al. |
| 6,425,173 B1 | 7/2002 | Enomoto et al. |
| 6,596,211 B2 | 7/2003 | Kawamura et al. |
| 6,619,943 B1 | 9/2003 | Sameshima et al. |
| 7,867,426 B2 | 1/2011 | Ziran et al. |
| 8,641,409 B2 | 2/2014 | Hollriegl et al. |
| 8,951,034 B2 | 2/2015 | Christiansen et al. |
| 9,028,238 B2 | 5/2015 | Garceau et al. |
| 9,033,694 B2 | 5/2015 | Garceau et al. |
| 9,381,679 B2 | 7/2016 | Bishop et al. |
| 2002/0185777 A1 | 12/2002 | Boath et al. |
| 2013/0221580 A1* | 8/2013 | Bishop .................. B29C 70/46 264/479 |
| 2013/0232751 A1* | 9/2013 | Hertel .................... B23P 6/00 29/402.18 |
| 2015/0314487 A1 | 11/2015 | Garcia Martin et al. |
| 2016/0176085 A1 | 6/2016 | Brok et al. |
| 2016/0361846 A1 | 12/2016 | Backhaus et al. |

FOREIGN PATENT DOCUMENTS

| | | |
|---|---|---|
| CA | 2932506 A1 | 6/2016 |
| EP | 1111737 B1 | 7/2004 |
| EP | 0928674 B1 | 3/2005 |
| EP | 2422953 A2 | 2/2012 |
| EP | 2939820 A1 | 11/2015 |
| WO | WO2015091052 A2 | 6/2015 |
| WO | WO2016011655 A1 | 1/2016 |

\* cited by examiner

MODULAR TOOLING FOR MANUFACTURING MULTI-CAVITY COMPOSITE STRUCTURES

CROSS-REFERENCE TO RELATED APPLICATIONS

This application claims the benefit of provisional U.S. Patent Application Ser. No. 62/218,292, which was filed Sep. 14, 2015, the entire contents of which are incorporated by reference herein.

FIELD OF THE INVENTION

The application generally relates to the manufacture of composite structures and, more particularly, to the manufacture of such structures including cavities and internal walls.

BACKGROUND OF THE INVENTION

A structure having multiple cavities defined therein includes one or more internal walls or partitions. Because pressure must be maintained on each wall during curing of composite structures, manufacturing of composite structures having multiple cavities is limited by the ability to properly apply pressure to all wall surfaces; accordingly, such structures are typically obtained by manufacturing and curing smaller individual components where all walls are external walls, and then bonding and/or mechanically fastening the individual components.

SUMMARY OF THE INVENTION

In one aspect, there is provided a method of manufacturing a monolithic component having an internal wall, the method comprising: separately placing uncured composite material on a first mold surface of a first mold part and on a second mold surface of a second mold part; placing the first and second mold parts adjacent each other on a support plate, the first and second mold surfaces including internal regions facing each other; attaching the first mold part to the support plate so as to fix a relative position of the first mold part with respect to the support plate; interconnecting the first and second mold parts through a direct connection allowing limited movement of the second mold part on the support plate toward the first mold part, a portion of the uncured material extending in contact with the internal regions of the first and second mold parts, the limited movement varying a distance between the internal regions; biasing the second mold part toward the first mold part along a direction of the limited movement to provide a predetermined compressive force on the portion of the uncured composite material extending between the internal regions; and curing the composite material by heating the composite material under pressure while maintaining the bias along the direction of the limited movement to obtain the monolithic component, the internal wall being formed between the internal regions.

In another aspect, there is provided a method of manufacturing a monolithic component having multiple internal walls, the method comprising: separately placing uncured composite material on mold surfaces of a plurality of mold parts; placing the mold parts on a support plate adjacent one another, a portion of the uncured composite material extending between and in contact with each of the mold parts; interconnecting the mold parts through a connection allowing limited relative movement between the mold parts on the support plate along a direction corresponding to a thickness of the portion of the uncured composite material extending between the mold parts; applying a biasing force that biases the mold parts toward each other along the direction of limited relative movement to provide a compressive force on the portion of uncured composite material extending between the mold parts; and curing the composite material by heating the composite material under pressure to obtain the monolithic component having internal walls, the biasing force causing the mold parts to move toward each other as the thickness of the portion of uncured material extending between the mold parts reduces during curing.

In a further aspect, there is provided a tool assembly for layup and cure of a composite material in the manufacture of a monolithic component having an internal wall, the tool assembly comprising: a support plate; a plurality of mold parts disposed on the support plate adjacent one another and each including a mold surface, the mold surfaces of the mold parts having internal regions facing each other; a plurality of connection members detachably interconnecting the mold parts, the connection members allowing limited relative movement between the mold parts along the support plate, the limited relative movement varying a distance between the internal regions of the mold surfaces of the mold parts; wherein the connection members bias the mold parts toward each other along a direction of the limited relative movement, the bias providing a compressive force between the internal regions of the mold surfaces of the mold parts.

BRIEF DESCRIPTION OF THE DRAWINGS

Reference is now made to the accompanying figures in which.

DETAILED DESCRIPTION

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
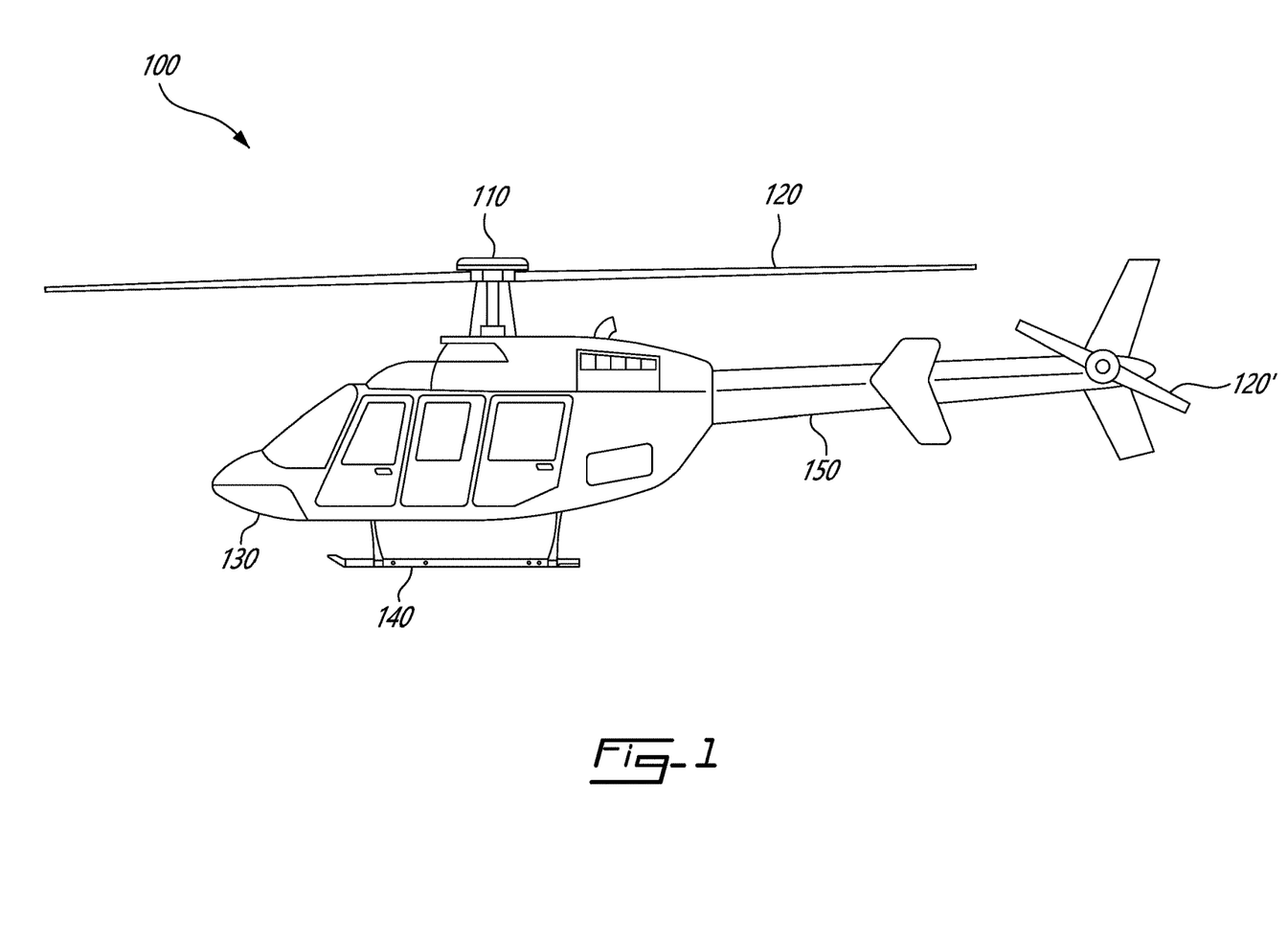
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

The present disclosure provides for a tool assembly using a combination of open and closed mould processes. In a particular embodiment, the tool assembly allows manufacturing of complex composite tridimensional multi-cavity structures with a single curing operation; this may allow for a reduction of parts count, assembly steps, cycle time and/or manufacturing cost that would otherwise be necessary to manufacture the structure in multiple sections before interconnecting the cured sections.

Figure 2:
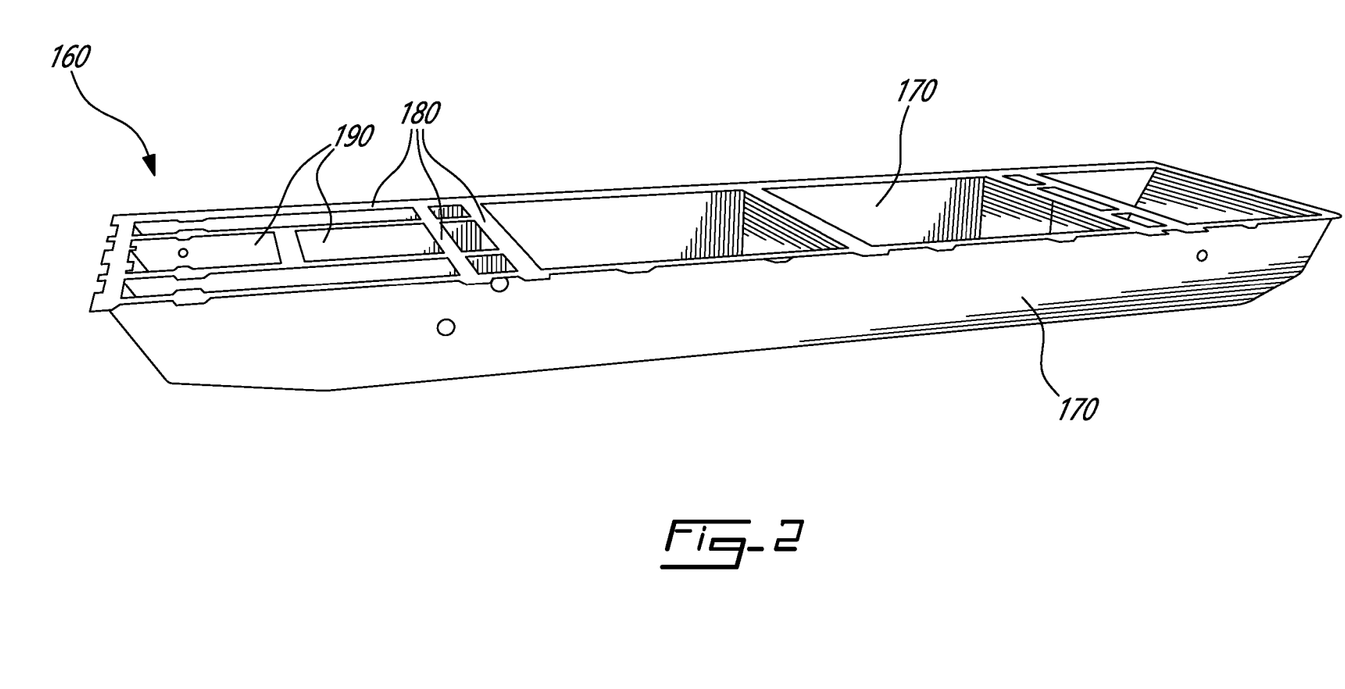
FIG. 2 is a schematic tridimensional view of a floor structure of a rotorcraft such as shown in FIG. 1, in accordance with a particular embodiment.

In a particular embodiment, and referring to FIG. 2, the tool assembly is used to manufacture a floor structure 160 of the rotorcraft 100. The floor structure 160 includes external walls 170 defining its perimeter, and multiple internal walls 180—which extend between and connect two external walls 170, an external wall 170 and another internal wall 180, or two other internal walls 180—in order to form multiple cavities or compartments 190 separated by the internal walls 180. The compartments 190 can be configured, for example, to define one or more fuel tanks. Other uses are also possible.

Figure 3:
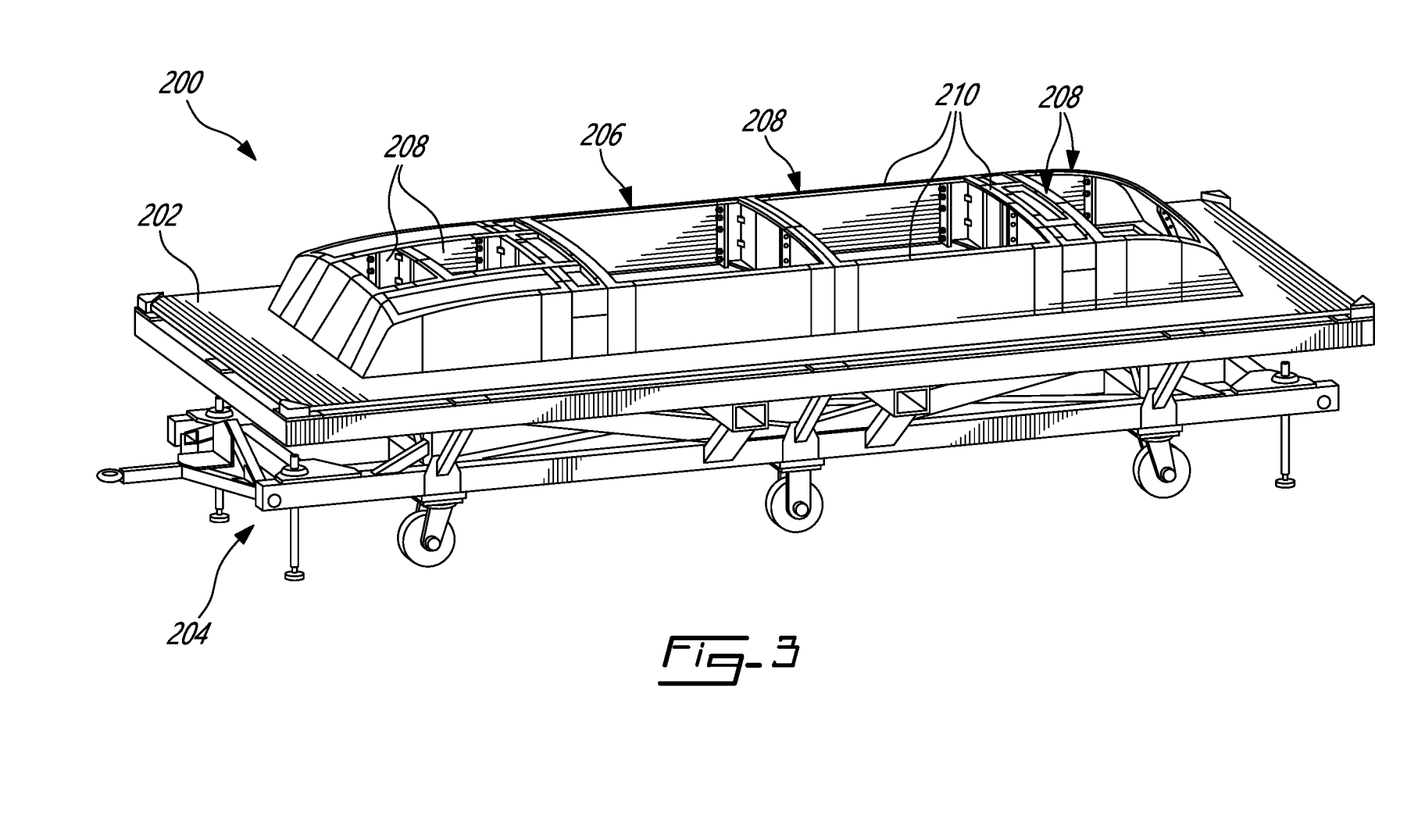
FIG. 3 is a schematic tridimensional view of a tool assembly which may be used to manufacture the floor structure of FIG. 2, in accordance with a particular embodiment.

Referring to FIG. 3, a tool assembly 200 according to a particular embodiment is schematically shown. The tool assembly 200 is configured to manufacture the floor structure 160 of FIG. 2 in a monolithic manner. It is understood that the particular configuration of the tool assembly 200 shown is exemplary only, and may be adapted to form any suitable composite component including one or more internal wall(s).

The tool assembly 200 generally includes a support plate 202, which may be, for example, received on a wheeled and/or adjustable base 204 for ease of transport and/or use. Alternatively, the support plate 200 may be received on any other suitable type of base.

Figure 4A:
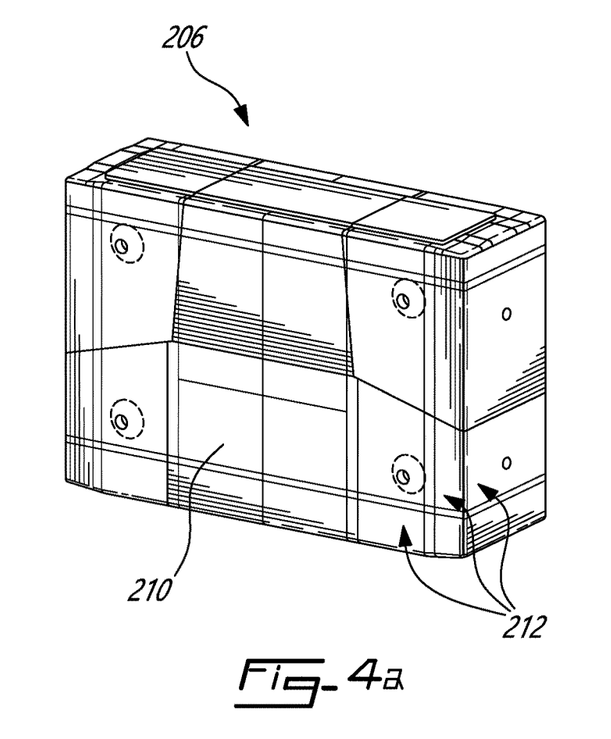
FIG. 4*a* is a schematic tridimensional view of a mold part of the tool assembly of FIG. 3, in accordance with a particular embodiment.
Figure 4B:
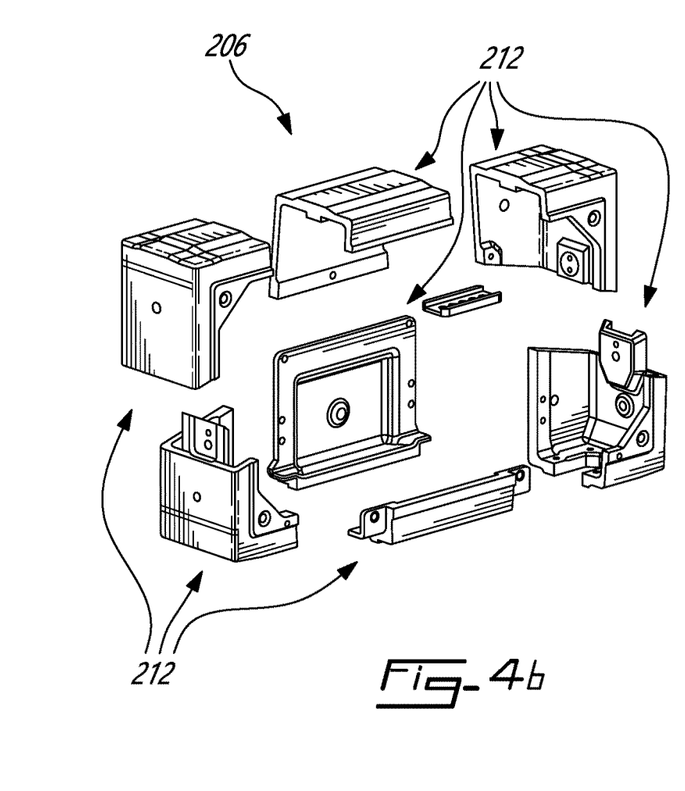
FIG. 4*b* is a schematic tridimensional exploded view of the mold part of FIG. 4*a*.

The tool assembly 200 includes multiple mold parts 206, 208 which are disposed on the support plate 202 adjacent one another. The tool assembly 200 includes a mold part 206, 208 for each of the cavities defined in the finished component; each mold part 206, 208 is defined as an insert which is removed from the respective cavity after the composite material is cured. Accordingly, each mold part 206, 208 is made of multiple mold elements which are connected in a disconnectable manner, allowing the mold part 206, 208 to be dismantled for disengagement from the cured composite material and removal from the cavity. An exemplary mold part 206 is shown in FIGS. 4a-4b. In this embodiment, the mold part 206 is hollow, and includes a plurality of elements 212 each defining part of the mold surface 210 of the mold part. Other configurations are also possible.

Each mold part 206, 208 is made of a suitable material allowing predictable thermal expansion for application of the consolidation pressure during the cure cycle, and contraction for unmoulding after the cure cycle. In a particular embodiment, the mold parts 206, 208 are made of a suitable type of steel, such as, for example, P20 steel. Other materials may alternately be used.

Referring back to FIG. 3, each mold part 206, 208 defines a mold surface 210 for receiving the composite material. In the embodiment shown, the mold surface 210 of each mold part 206, 208 extends around its periphery and along its top surface; the top surfaces of adjacent mold parts 206, 208 are aligned with each other, and the peripheral surfaces of adjacent mold parts 206, 208 are aligned with each other, so that they cooperate together to define a continuous mold surface adapted to receive the composite material. It is understood that in the particular embodiment shown, "top surface" refers to the position of the tool assembly 200 as shown in FIG. 2, i.e., for layup and cure. Because the particular component shown is molded in an "upside down" configuration, the top surface of the tool assembly 200 corresponds, to the bottom wall of the component.

Figure 5:
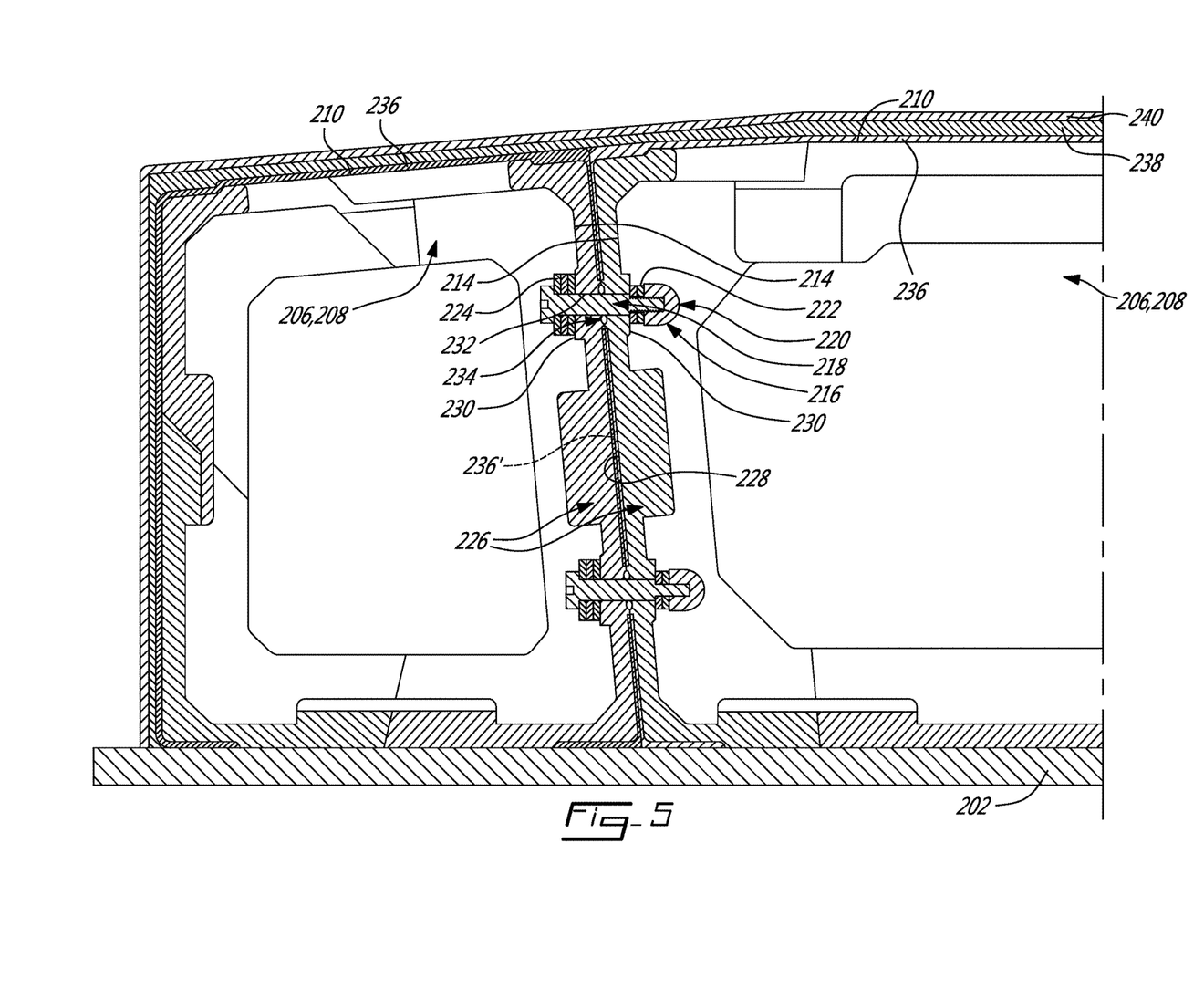
FIG. 5 is a schematic cross-sectional view of part of the tool assembly of FIG. 3 showing a connection between adjacent ones of the mold parts, in accordance with a particular embodiment.

Referring to FIG. 5, the mold surfaces 210 of adjacent mold parts 206, 208 have internal regions 214 facing each other. Each internal wall 180 of the component is formed between the facing internal regions 214 of adjacent mold parts 206, 208; accordingly, the internal regions 214 are configured to conform to a respective one of the two opposed surfaces of the associated internal wall 180.

The adjacent mold parts 206, 208 are connected to each other through a plurality of connection members 216, which allow limited relative movement between the adjacent mold parts 206, 208 along the support plate 202. This limited relative movement varies the distance between the internal regions 214 of the mold surfaces 210 of the adjacent mold parts 206, 208. The connection members 216 also bias the adjacent mold parts 206, 208 toward each other in the direction of this limited relative movement. This bias provides a compressive force between the internal regions 214 of the adjacent mold parts for maintaining pressure on the laminate forming the corresponding internal wall 180 during cure, as will be further detailed below.

In the embodiment shown, each connection member 216 includes a threaded fastener 218 (e.g., screw), a threaded nut 220, one of more flat washers 222 (two in the embodiment shown) and one or more spring washers 224 (four in the embodiment shown). Each mold part 206, 208 includes a flange 226 in proximity of the internal region 214. The flanges 226 have facing surfaces 228 spaced apart from one another to allow the relative movement, and opposed outer surfaces 230, and have aligned holes 232 defined therethrough. The threaded fastener 218 is received through the spring washers 224, through the flanges 226 into the aligned holes 232, and through the flat washers 222. The spring washers 224 are located between the head of the threaded fastener 218 and the outer surface 230 of one of the flanges 226. The nut 220 is engaged to the end of the threaded fastener 218, with the flat washers 222 located between the outer surface 230 of the other flange 226 and the nut 220.

In a particular embodiment, the threaded portion of the fastener 218 is spaced apart from its head, and the flat washers 222 are sized so that the threaded portion can extend therethrough but the larger unthreaded portion cannot. Accordingly, a maximal distance between the adjacent mold parts 206, 208 can be selected by changing the number and/or thickness of the flat washers 222, and/or by changing the number and/or thickness of the spring washers 224.

In the embodiment shown, a seal 234 such as an O-ring is inserted around the fastener 218 between the two flanges 226. In a particular embodiment, the seal 234 is configured to reduce, minimize or prevent resin from flowing through the aligned holes 232 in the flanges during cure.

It is understood that the connection member 216 shown is exemplary only, and that any other suitable connection member may alternately be used. For example, the spring washers 224 can be replaced by any other suitable type of spring(s) or biasing member(s), and the connection member 216 may include for example any one or any combination of clamping pin(s), ball lock pin(s), expanding pin(s), Carr lock® system(s), index plunger(s), spring locating pin(s), etc.

Although not shown, in a particular embodiment alignment features between the adjacent mold parts 206,208 are provided—for example, alignment pins extending from one of the mold parts and received in complementary openings in the other one of the mold parts, or alignment fasteners received through corresponding holes in flanges of the adjacent mold parts and removably retained therein, for example using bolts. The alignment features are, however, disconnectable so as to be able to dismantle the tool assembly 200 after the composite material is cured.

Referring back to FIG. 3, in the embodiment shown, one of the mold parts defines a reference mold part 206, and is accordingly fixedly connected to the support plate 202 so as to have a fixed position relative thereto. The other mold parts 208 are displaceable, and are all connected to the reference mold part 206, whether directly or through a connection with another mold part 208 (i.e., with a mold part 208 directly connected to the reference mold part 206, or with a mold part 208 connected to a mold part 208, which is directly connected to the reference mold part 206, etc.). The interconnected mold parts 206, 208 thus form a whole of connected pieces, with one of the pieces being fixed to the support plate 202 to define a reference point, and the other pieces biased against one another and toward that fixed piece. The displaceable mold parts 208 move along the support plate 202 and accordingly move in a horizontal or substantially horizontal direction (both generally herein referred to as "horizontal"), i.e., in a direction aligned with the thickness of the composite material received between the adjacent mold parts 206, 208. In the embodiment shown, the connection members 216 extend in parallel to the surface of the support plate 202, i.e. horizontally. The connection members 216 may alternatively be slightly angled with respect to surface of the support plate 202.

Accordingly, in a particular embodiment, the tool assembly 200 allows for the manufacture of a multi-cavity component by allowing the application of consolidation pressure on every laminate wall, including the internal wall(s) 180, while maintaining dimensional requirements; the tool assembly 200 can then be disassembled after the cure cycle for disengagement from the cured composite material.

Referring back to FIG. 5, in use and in accordance with a particular embodiment, the monolithic component is manufactured by separately placing uncured composite material 236 on the mold surfaces 210 of each of the mold parts 206, 208, for example around their periphery and top surface. The layup of composite material 236 can be done using any suitable method or combination of methods, including, but not limited to, manual or automated layup of prepreg layers/plies, and automated fiber placement (AFP). The number of mold parts 206, 208 will vary in accordance with the configuration of the component, number of internal walls 180 and cavities 190. In a particular embodiment, two mold parts 206, 208 are provided. In another particular embodiment, more than two mold parts 206, 208 are provided, for example, eight mold parts 206, 208. Other quantities are also possible.

In a particular embodiment, the uncured composite material 236 is placed on the mold surfaces 210 by manual layup of prepreg plies. The uncured composite material can be compacted using any suitable method, for example, by debulking with a vacuum bag, after the some and/or all of the plies have been placed. In one exemplary embodiment, debulking is performed regularly during manual layup of the plies, approximately after layup of every third ply.

The mold parts 206, 208 are placed adjacent each other on the support plate 202 (FIG. 3), in the relative position corresponding to the configuration of the component being manufactured. Accordingly, portions 236' of the uncured material 236 previously disposed on the mold surface 210 of each mold part 206, 208 are located between and in contact with the facing internal regions 214 of the mold surfaces 210 of the adjacent mold parts 206, 208. These portions 236' may be formed from the material of one or both of the adjacent mold parts 206, 208; in the embodiment shown, the portions 236' of uncured material between the adjacent mold parts 206, 208 are each formed by the combination of the uncured material previously disposed on the internal regions 214 of both adjacent mold parts 206, 208.

The adjacent mold parts 206, 208 (fixed mold part 206 with displaceable mold part 208, or two displaceable mold parts 208) are directly interconnected by the connection members 216, which allow the relative limited movement of the mold parts 206, 208 on the support plate 202 toward each other. The relative movement varies the distance between the facing internal regions 214. The connection members 216 bias the mold parts 206, 208 toward each other along the direction of the relative movement. This provides a compressive force on the portion 236' of uncured composite material 236 extending between the facing internal regions 214, so as to maintain contact of the internal region 214 with the material extending therebetween during the cure cycle.

The portions 236' of uncured composite material 236 extending between the internal regions 214 of the adjacent mold parts 206, 208 will form the internal walls 180 of the component. Accordingly, in a particular embodiment the portions 236' of uncured composite material 236 extending between the adjacent internal regions 214 is a laminate of multiple plies of prepreg material having opposed surfaces spaced apart a distance corresponding to the thickness of the laminate, and each of the surfaces is in contact with one of the internal regions 214. The internal regions 214 each press directly on a surface of the laminate during the cure cycle.

In a particular embodiment, the compressive force provided by the bias of the connection members 216 is at least 80 psi, for example from 80 psi to 100 psi.

In the embodiment shown, after the mold parts 206, 208 are interconnected, one or more continuous layer(s) or ply(ies) of composite material 238 is placed over the uncured composite material 236 already received on at least some of the adjacent mold parts 206, 208, and over the uncured material 236' received between the internal regions 214 of these mold parts 206, 208. The additional layer(s) 236 form a link between the sections defined by each of the mold parts 206, 208, for example, to form a continuous peripheral wall and/or top wall in the component.

If required, metallic parts and/or cured composite laminates may be incorporated in the component, and disposed in contact with the uncured composite material 236, 238 before cure.

The composite material 236, 238 is cured by heating it on the tool assembly 200 under pressure—e.g., under mechanical pressure, under pressure applied by a vacuum bag, and/or under a pressurized atmosphere in an autoclave—while maintaining the bias of the mold parts 206, 208 towards each other. It is understood that the uncured composite material 236, 238 and tool assembly 200 are suitably prepared before the cure cycle, such as by vacuum bagging with suitable breather material and caul plates or pressure pads; such preparation methods are well known in the art and will not be discussed further herein. For example, in the embodiment shown in FIG. 5, a caul plate 240 having a substantially U-shaped cross-section (only half of which is shown) is provided over the adjacent mold parts 206, 208, configured to enclose the mold parts 206, 208 to cover the top surfaces and opposed peripheral surfaces thereof. Other configurations are also possible.

If metallic parts and/or cured composite laminates were disposed in contact with the uncured material 236, 238 before the cure cycle, the metallic parts and/or cured composite laminates are bonded with the composite material being molded by the heat and pressure of the cure cycle. The co-curing and/or co-bonding of the elements and composite laminates results in a monolithic component once the cure cycle is performed.

During cure, the thickness of the laminate tends to reduce, due to compression and/or leaking of the resin; for example, a ply of prepreg can be 0.010 inch thick during layup, and become 0.008 inch thick during the cure cycle. However, the pressure must be maintained on the surfaces of the laminate in order to provide for the desired surface finish and dimensional tolerances.

In the areas of the components that are fully enclosed by the mold parts, for example the internal walls 180, the pressure is applied, transferred and maintained on all the wall surfaces by the relative movement and bias of the adjacent mold parts 206, 208, along the direction of compaction of the laminates. When a fixed mold part 206 is provided, the movement of the mold parts 208 allows for a convergence toward a fixed reference. The laminate thickness of the fully enclosed walls can be controlled by physical stoppers, including but not limited to, the fixed mold part 206. Accordingly, in a particular embodiment, the connection members 216 allowing the limited relative movement between the adjacent mold parts 206, 208 and providing the bias of the mold parts 206, 208 toward each other allow for close dimensional tolerances to be achieved by transferring the consolidation pressure to the laminates defining the internal walls 180.

The laminate thickness of the walls formed under an open mold configuration can be controlled by the external pressure applied during cure (e.g. vacuum or autoclave pressure). The consolidation pressure during cure can be generated by the autoclave and vacuum bag on the tool assembly 200 or by mechanical pressure out of autoclave; it can also/alternatively be generated directly on the laminates and/or by thermal expansion of the tool assembly 200.

In a particular embodiment, the mold parts 206, 208 each made from multiple interconnected elements 212 allow for the mold parts 206, 208 to be effectively collapsible, so as to enable precise molding of complex features such as return flanges and cavities, allowing the mold parts 206, 208 to be dismantled piece by piece for removal from the cured composite structure.

In a particular embodiment, the modular configuration of the tool assembly 200 with the multiple disconnectable mold parts 206, 208 allows for the mold parts 206, 208 to be interchanged, expanded, replaced and/or combined, enabling different configurations of components having a complex structure to be manufactured with the tool assembly 200.

Although the present tool assembly 200 and method have been discussed in relation to the floor structure 160 of a rotorcraft 100, it is understood that, alternatively, the tool assembly 200 can be configured to manufacture any other suitable type of monolithic composite component including cavities and internal walls, including but not limited to, other tridimensional complex multi-cavity structures in rotorcraft floor assemblies and roof assemblies, and any suitable multi-cavity structure in aerospace, marine, recreation crafts, etc.

The above description is meant to be exemplary only, and one skilled in the art will recognize that changes may be made to the embodiments described without departing from the scope of the invention disclosed. Modifications that fall within the scope of the present invention will be apparent to those skilled in the art, in light of a review of this disclosure, and such modifications are intended to fall within the appended claims.

The invention claimed is:

1. A method of manufacturing a monolithic component having an internal wall, the method comprising:
    separately placing uncured composite material on a first mold surface of a first mold part and on a second mold surface of a second mold part;
    placing the first and second mold parts adjacent each other on a support plate, the first and second mold surfaces including internal regions facing each other;
    attaching the first mold part to the support plate so as to fix a relative position of the first mold part with respect to the support plate, wherein the second mold part is not used to attach the first mold part to the support plate;
    interconnecting the first and second mold parts through a direct connection allowing limited movement of the second mold part on the support plate toward the first mold part, a portion of the uncured material extending in contact with the internal regions of the first and second mold parts, the limited movement varying a distance between the internal regions;
    biasing the second mold part toward the first mold part along a direction of the limited movement to provide a predetermined compressive force on the portion of the uncured composite material extending between the internal regions; and curing the composite material by heating the composite material under pressure while maintaining the bias along the direction of the limited movement to obtain the monolithic component, the internal wall being formed between the internal regions.

2. The method according to claim 1, further comprising, before curing the composite material and after interconnecting the first and second mold parts, placing at least one continuous layer of uncured composite material over the uncured composite material received on the first and second mold surfaces and over the portion of the uncured material received between the internal regions.

3. The method according to claim 1, further comprising, before curing the composite material:
placing uncured composite material on a third mold surface of a third mold part;
placing the third mold part on the support plate adjacent the second mold part, the second and third mold surfaces including additional internal regions facing each other;
interconnecting the second and third mold parts through an additional direct connection allowing additional limited relative movement on the support plate between the second and third mold parts, an additional portion of the uncured material extending in contact with the additional internal regions, the additional relative movement varying a distance between the additional internal regions;
biasing the second and third mold parts toward each other along a direction of the additional limited movement to provide a predetermined compressive force on the additional portion of the uncured composite material extending between the additional internal regions; and
wherein curing the composite material is performed while also maintaining the bias along the direction of the additional limited movement, an additional internal wall being formed between the additional internal regions.

4. The method according to claim 1, wherein:
interconnecting the first and second mold parts includes interconnecting the first and second mold parts through a plurality of fasteners received through flanges of the first and second mold parts, and
biasing the first and second mold parts includes biasing the first and second mold parts with at least one spring washer being received on each of the fasteners.

5. The method according to claim 1, wherein the direction of the relative movement is horizontal.

6. The method according to claim 1, wherein the portion of uncured composite material includes an assembly of plies of prepreg material having opposed surfaces spaced apart a distance corresponding to a thickness of the assembly of plies, each of the surfaces of the assembly of plies being in contact with a respective one of the internal regions.

7. The method according to claim 1, wherein the compressive force is at least 80 psi.

8. A method of manufacturing a monolithic component having multiple internal walls, the method comprising:
separately placing uncured composite material on mold surfaces of a plurality of mold parts;
placing the mold parts on a support plate adjacent one another, a portion of the uncured composite material extending between and in contact with each of the mold parts;
interconnecting the mold parts through a connection allowing limited relative movement between the mold parts on the support plate along a direction corresponding to a thickness of the portion of the uncured composite material extending between the mold parts;
applying a biasing force that biases the mold parts toward each other along the direction of limited relative movement to provide a compressive force on the portion of uncured composite material extending between the mold parts; and
curing the composite material by heating the composite material under pressure to obtain the monolithic component having internal walls, the biasing force causing the mold parts to move toward each other as the thickness of the portion of uncured material extending between the mold parts reduces during curing;
wherein the mold parts comprise a reference mold part attached to the support plate without the use of any of the other mold parts.

9. The method according to claim 8, wherein:
the mold parts comprise a plurality of displaceable mold parts that are interconnected so that each displaceable mold part is connected to the reference mold part, either directly or through connection with another of the displaceable mold parts.

10. The method according to claim 8, further comprising, before curing the composite material and after interconnecting the mold parts, placing at least one continuous layer of uncured composite material over the uncured composite material extending between the mold parts.

11. The method according to claim 8, wherein interconnecting the mold parts and applying the biasing force includes interconnecting the mold parts through a plurality of fasteners received through flanges of the mold parts with at least one spring washer being received on each of the fasteners.

12. The method according to claim 8, wherein the direction of the relative movement is horizontal.

13. The method according to claim 8, wherein the portion of uncured composite material includes an assembly of plies of prepreg material having opposed surfaces spaced apart a distance corresponding to the thickness of the portion of uncured composite material, each of the opposed surfaces of the assembly of plies of prepreg material being in contact with one of the mold parts.

14. The method according to claim 8, wherein the compressive force is at least 80 psi.

* * * * *